United States Patent
Welchko et al.

(10) Patent No.: US 7,956,569 B2
(45) Date of Patent: Jun. 7, 2011

(54) DOUBLE ENDED INVERTER SYSTEM WITH AN IMPEDANCE SOURCE INVERTER SUBSYSTEM

(75) Inventors: Brian A. Welchko, Torrance, CA (US); James M. Nagashima, Cerritos, CA (US); Gregory S. Smith, Woodland Hills, CA (US); Sibaprasad Chakrabarti, Torrance, CA (US); Milun Perisic, Torrance, CA (US); George John, Cerritos, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 453 days.

(21) Appl. No.: 12/132,486

(22) Filed: Jun. 3, 2008

(65) Prior Publication Data
US 2009/0034308 A1    Feb. 5, 2009

Related U.S. Application Data

(60) Provisional application No. 60/952,764, filed on Jul. 30, 2007.

(51) Int. Cl.
*H02P 27/04*    (2006.01)
(52) U.S. Cl. .................. 318/801; 318/105; 318/400.27; 318/808
(58) Field of Classification Search .................. 318/105, 318/139, 400.13, 400.26, 400.27, 801, 808; 363/71, 98; 180/65.1
See application file for complete search history.

(56) References Cited

U.S. PATENT DOCUMENTS

| | | | |
|---|---|---|---|
| 5,389,749 A | 2/1995 | Hokari et al. | |
| 6,242,884 B1* | 6/2001 | Lipo et al. | 318/808 |
| 7,130,205 B2 | 10/2006 | Peng | |
| 7,154,237 B2* | 12/2006 | Welchko et al. | 318/400.27 |
| 7,199,535 B2* | 4/2007 | Welchko et al. | 318/105 |
| 2003/0231518 A1* | 12/2003 | Peng | 363/98 |
| 2006/0164027 A1* | 7/2006 | Welchko et al. | 318/105 |

(Continued)

FOREIGN PATENT DOCUMENTS

CN    1819419 A    8/2006

OTHER PUBLICATIONS

Singh, G.K., "Multi-Phase Induction Machine Drive Research—A Survey," Elsevier Science B.V., Electric Power Systems Research, 2002, pp. 139-147.

(Continued)

*Primary Examiner* — Paul Ip
(74) *Attorney, Agent, or Firm* — Ingrassia Fisher & Lorenz, P.C.

(57) ABSTRACT

A double ended inverter system suitable for use with an AC electric traction motor of a vehicle is provided. The double ended inverter system cooperates with a first DC energy source and a second DC energy source, which may have different nominal voltages. The double ended inverter system includes an impedance source inverter subsystem configured to drive the AC electric traction motor using the first energy source, and an inverter subsystem configured to drive the AC electric traction motor using the second energy source. The double ended inverter system also utilizes a controller coupled to the impedance source inverter subsystem and to the inverter subsystem. The controller is configured to control the impedance source inverter subsystem and the inverter subsystem in accordance with a boost operating mode, a traditional inverter operating mode, and a recharge operating mode of the double ended inverter system.

20 Claims, 2 Drawing Sheets

U.S. PATENT DOCUMENTS

2006/0164028 A1* 7/2006 Welchko et al. ............... 318/105
2006/0226703 A1 10/2006 Schreiber

OTHER PUBLICATIONS

Peng, Fang Zheng, "Z-Source Inverter," IEEE Transactions on Industry Applications, Mar./Apr. 2003, vol. 39, No. 2, pp. 504-510.

Jones, Martin et al., "A Six-Phase Series-Connected Two-Motor Drive With Decoupled Dynamic Control," IEEE Transactions on Industry Applications, Jul./Aug. 2005, vol. 41, No. 4, pp. 1056-1066.

Welchko, Brian A., "A Double-Ended Inverter System for the Combined Propulsion and Energy Management Functions in Hybrid Vehicles with Energy Storage," The 31st Annual Conference of the IEEE Industrial Electronics Society, IECON '05, Raleigh, North Carolina, Nov. 6-10, 2005, pp. 1-6.

Levi, Emil et al., "A Series-Connected Two-Motor Six-Phase Drive With Induction and Permanent Magnet Machines," IEEE Transactions on Energy Conversion, Mar. 2006, vol. 21, No. 1, pp. 121-129.

Chinese Office Action dated Nov. 5, 2010, for Application No. 2200810130168.9.

* cited by examiner

DOUBLE ENDED INVERTER SYSTEM WITH AN IMPEDANCE SOURCE INVERTER SUBSYSTEM

CROSS-REFERENCE TO RELATED APPLICATION

This application claims the benefit of U.S. provisional patent application Ser. No. 60/952,764, filed Jul. 30, 2007 (the entire content of which is incorporated by reference herein).

TECHNICAL FIELD

The subject matter described herein relates generally to an electric traction system. More particularly, the subject matter relates to a double ended inverter system, for use in a hybrid or electric vehicle, that includes an impedance source inverter.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric motors used in electric and hybrid electric vehicles, receive electrical power from alternating current (AC) power supplies. However, the power sources (e.g., batteries) used in such applications provide only direct current (DC) power. Thus, devices known as power inverters are used to convert the DC power to AC power. In addition, double ended inverter topologies can be used to drive a single AC motor with two DC power sources.

High voltage batteries or battery packs are typically used to provide electric power storage for the electric traction systems in most electric and hybrid electric vehicles. Such a high voltage battery may have a nominal voltage of 100 volts or more. Moreover, batteries are utilized to power other onboard subsystems, such as lighting subsystems, instrumentation subsystems, entertainment subsystems, and the like. For example, many electric and hybrid electric vehicles employ traditional subsystems that are powered by a 12 volt battery. Moreover, a vehicle may employ another low voltage system of approximately 42 volts to power intermediate power electrical loads such as an electric power steering subsystem.

For vehicles that utilize more than one voltage level, a device that can transfer energy from one voltage source to another is necessary to maintain desirable charge levels at each source. DC-to-DC converters are commonly used to maintain the charge levels of multiple sources in a hybrid or electric vehicle. A double ended inverter system is able to control state of charge levels between two voltage sources while simultaneously controlling the power delivered to an AC electric motor. However, traditional double ended inverter topologies ideally operate when the two energy sources have similar voltage levels. Therefore, a traditional double ended inverter topology may not operate in an efficient or optimized manner in a hybrid or electric vehicle system having significantly different voltage sources (e.g., 12 volts and 100+ volts).

BRIEF SUMMARY

A double ended inverter system for an AC electric traction motor of a vehicle is provided. The double ended inverter system includes a first energy source having a first nominal DC voltage, and a second energy source having a second nominal DC voltage that differs from the first nominal DC voltage. The double ended inverter system also includes an impedance source inverter subsystem coupled to the first energy source, and an inverter subsystem coupled to the second energy source. These inverter systems are configured to individually or collectively drive the AC electric traction motor.

An alternate embodiment of a double ended inverter system for an AC electric traction motor of a vehicle is also provided. The vehicle has a first energy source and a second energy source, and the double ended inverter system includes an impedance source inverter subsystem configured to drive the AC electric traction motor using the first energy source, an inverter subsystem configured to drive the AC electric traction motor using the second energy source, and a controller coupled to the impedance source inverter subsystem and to the inverter subsystem. The controller is configured to control the impedance source inverter subsystem and the inverter subsystem in accordance with a boost operating mode, a traditional inverter operating mode, and a recharge operating mode of the double ended inverter system.

An electric traction system for a vehicle having a high voltage battery and a low voltage battery is also provided. The electric traction system includes an AC electric motor and a double ended inverter system coupled to the AC electric motor. The double ended inverter system is configured to drive the AC electric motor using energy obtained from the high voltage battery and energy obtained from the low voltage battery. The double ended inverter system includes a first inverter section coupled to the AC electric motor, a crossed LC X-link coupled between the first inverter section and the low voltage battery, and a second inverter section coupled between the high voltage battery and the AC electric motor.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. For the sake of brevity, conventional techniques related to inverters, AC motor control, electric and hybrid electric vehicle operation, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

Figure 2:
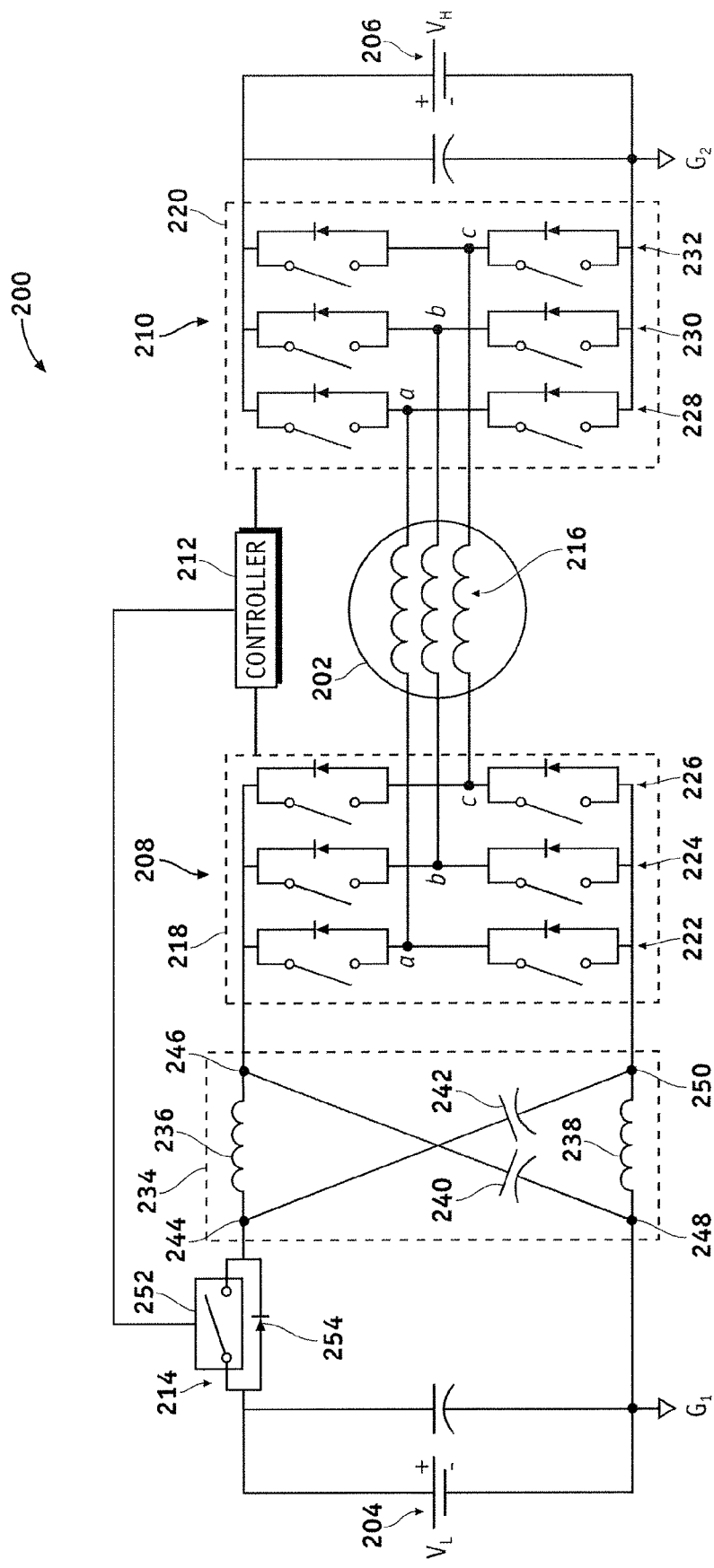
FIG. 2 is a schematic circuit representation of an exemplary embodiment of a double ended inverter system suitable for use with an electric or hybrid electric vehicle.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

A double ended inverter system for an electric traction system of a vehicle is described here. The double ended inverter system utilizes an impedance source inverter topology coupled to one DC energy source, and a traditional inverter topology coupled to another DC energy source. The use of an impedance source inverter topology makes it economical to employ voltage sources having significantly different voltage ratings. In certain embodiments, the traction system is designed such that both sides of the double ended inverter system have bidirectional charge capability.

Figure 1:
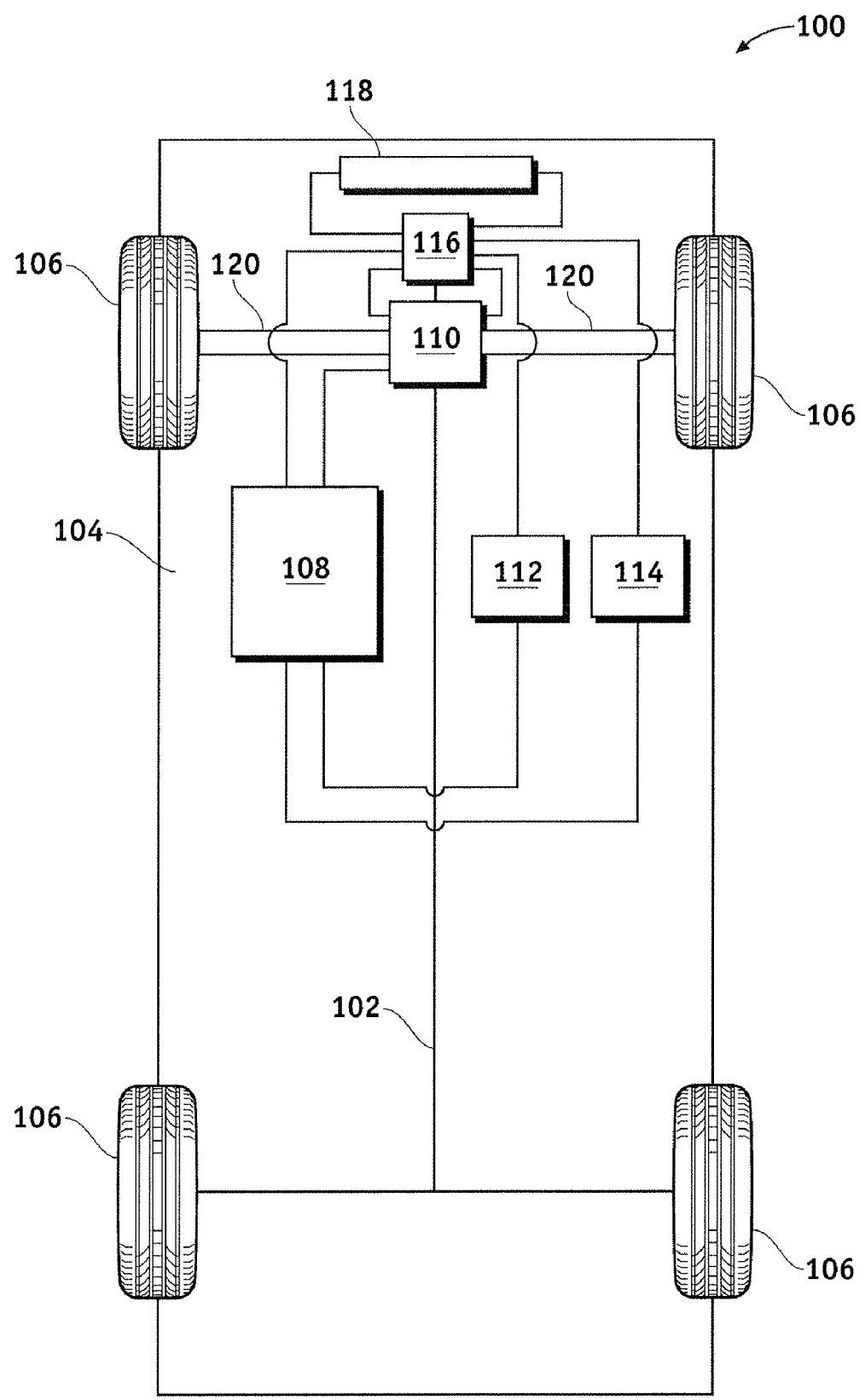
FIG. 1 is a schematic representation of an exemplary vehicle that incorporates an embodiment of a double ended inverter system.

FIG. 1 is a schematic representation of an exemplary vehicle 100 that incorporates an embodiment of a double ended inverter system. Vehicle 100 preferably incorporates an embodiment of a double ended inverter system as described in more detail below. The vehicle 100 generally includes a chassis 102, a body 104, four wheels 106, and an electronic control system 108. The body 104 is arranged on chassis 102 and substantially encloses the other components of vehicle 100. The body 104 and chassis 102 may jointly form a frame. The wheels 106 are each rotationally coupled to chassis 102 near a respective corner of body 104.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 100 may also incorporate any one of, or combination of, a number of different types of engines and/or traction systems, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, vehicle 100 is a fully electric or a hybrid electric vehicle having an electric traction system, and vehicle 100 further includes an electric motor (or traction motor) 110, a first DC energy source 112 having a first nominal voltage, a second DC energy source 114 having a second nominal voltage, a double ended inverter system 116, and a radiator 118. As shown, first DC energy source 112 and second DC energy source 114 are in operable communication and/or electrically connected to electronic control system 108 and to double ended inverter system 116. It should also be noted that vehicle 100, in the depicted embodiment, does not include a direct current-to-direct current (DC/DC) power converter as an integral part of its electric traction propulsion system.

A DC energy source utilized by vehicle 100 may be realized as a battery, a battery pack, a fuel cell, a supercapacitor, or the like. For the embodiments described here, first DC energy source 112 and second DC energy source 114 are batteries (or battery packs) of significantly different voltages. Although not always required, this description assumes that first DC energy source 112 and second DC energy source 114 are rechargeable. Moreover, first DC energy source 112 and second DC energy source 114 may have other different and unmatched operating characteristics, such as current ratings. In this regard, first DC energy source 112 can be a relatively low voltage battery having a nominal operating voltage within the range of about 12 to 42 volts. For purposes of this description, the exemplary embodiment of vehicle 100 employs a 12 volt battery for first DC energy source 112. In contrast, second DC energy source 114 can be a relatively high voltage battery having a nominal operating voltage within the range of about 42 to 350 volts. For purposes of this description, the exemplary embodiment of vehicle 100 employs a battery that provides more than 60 volts (e.g., 100 volts) for second DC energy source 114. The techniques and technologies described herein are well suited for use in an embodiment wherein the nominal DC voltage provided by first DC energy source 112 is less than half of the nominal DC voltage provided by second DC energy source 114.

The motor 110 is preferably a three-phase alternating current (AC) electric traction motor, although other types of motors having a different number of phases could be employed. As shown in FIG. 1, motor 110 may also include or cooperate with a transmission such that motor 110 and the transmission are mechanically coupled to at least some of the wheels 106 through one or more drive shafts 120. The radiator 118 is connected to the frame at an outer portion thereof and although not illustrated in detail, includes multiple cooling channels that contain a cooling fluid (i.e., coolant), such as water and/or ethylene glycol (i.e., antifreeze). The radiator 118 is coupled to double ended inverter system 116 and to motor 110 for purposes of routing the coolant to those components. In one embodiment, double ended inverter system 116 receives and shares coolant with motor 110. In alternative embodiments, the double ended inverter system 116 may be air cooled.

The electronic control system 108 is in operable communication with motor 110, first DC energy source 112, second DC energy source 114, and double ended inverter system 116. Although not shown in detail, electronic control system 108 includes various sensors and automotive control modules, or electronic control units (ECUs), such as an inverter control module (i.e., the controller shown in FIG. 2) and a vehicle controller, and at least one processor and/or a memory which includes instructions stored thereon (or in another computer-readable medium) for carrying out the processes and methods as described below.

FIG. 2 is a schematic circuit representation of an embodiment of a double ended inverter system 200 suitable for use with an electric or hybrid electric vehicle. In certain embodiments, double ended inverter system 116 (shown in FIG. 1) can be implemented in this manner. As depicted in FIG. 2, double ended inverter system 200 is coupled to, and cooperates with, an AC electric traction motor 202, a low voltage battery 204, and a high voltage battery 206. Double ended inverter system 200 generally includes, without limitation: an impedance source inverter subsystem 208 coupled to low voltage battery 204; an inverter subsystem 210 coupled to high voltage battery 206, and a controller 212 coupled to impedance source inverter subsystem 208 and to inverter subsystem 210. To support recharging of low voltage battery 204, double ended inverter system 200 may utilize a switched diode element 214 coupled between low voltage battery 204 and impedance source inverter subsystem 208. Double ended inverter system 200 allows AC electric traction motor 202 to be powered by the different batteries, even though the batteries have significantly different nominal operating voltages. As explained in more detail below, this topology can provide voltage matching between low voltage battery 204 and high voltage battery 206.

The AC electric traction motor 202, in one embodiment, is a three phase motor that includes a set of three windings (or coils) 216, each corresponding to one phase of AC electric traction motor 202, as is commonly understood. In one embodiment, the neutral point of AC electric traction motor 202 is opened up to make it a six terminal, three phase motor. Although not illustrated, AC electric traction motor 202 includes a stator assembly (including the coils) and a rotor assembly (including a ferromagnetic core), as will be appreciated by one skilled in the art.

Impedance source inverter subsystem 208 includes an inverter section 218, and inverter subsystem 210 includes an inverter section 220. For this embodiment, inverter section 218 and inverter section 220 each includes six switches (e.g., semiconductor devices, such as transistors) with antiparallel diodes (i.e., the direction of current through the transistor switch is opposite to the direction of allowable current through the respective diode). As shown, the switches in inverter section 218 of impedance source inverter subsystem 208 are arranged into three pairs (or legs): pairs 222, 224, and 226. Similarly, the switches in inverter section 220 of inverter subsystem 210 are arranged into three pairs (or legs): pairs 228, 230, and 232. A first winding in the set of windings 216 is electrically coupled, at opposing ends thereof, between the switches of pair 222 (in inverter section 218) and the switches of pair 228 (in inverter section 220). A second winding in the set of windings 216 is coupled between the switches of pair 224 (in inverter section 218) and the switches of pair 230 (in inverter section 220). A third winding in the set of windings 216 is coupled between the switches of pair 226 (in inverter section 218) and the switches of pair 232 (in inverter section 220). Thus, one end of each winding is coupled to impedance source inverter subsystem 208, and the opposite end of each winding is coupled to inverter subsystem 210.

Impedance source inverter subsystem 208 and inverter subsystem 210 are configured to drive AC electric traction motor 202, individually or collectively (depending upon the particular operating conditions). In this regard, controller 212 is suitably configured to influence the operation of impedance source inverter subsystem 208 and inverter subsystem 210 to manage power transfer among low voltage battery 204, high voltage battery 206, and AC electric traction motor 202. For example, the controller 212 is preferably configured to be responsive to commands received from the driver of the vehicle (e.g., via an accelerator pedal) and provides control signals or commands to inverter section 218 of impedance source inverter subsystem 208 and to inverter section 220 of inverter subsystem 210 to control the output of inverter sections 218 and 220. In practice, high frequency pulse width modulation (PWM) techniques may be employed to control inverter sections 218 and 220 and to manage the voltage produced by inverter sections 218 and 220.

In addition to inverter section 218, impedance source inverter subsystem 208 includes a crossed LC X-link 234, which is coupled between inverter section 218 and low voltage battery 204. This particular embodiment of crossed LC X-link 234 includes a first inductance element 236, a second inductance element 238, a first capacitance element 240, and a second capacitance element 242. One end of inductance element 236 is coupled to a node 244, and the other end of inductance element 236 is coupled to a node 246. One end of inductance element 238 is coupled to a node 248, and the other end of inductance element 238 is coupled to a node 250. Inverter section 218 may be connected between nodes 246 and 250, as depicted in FIG. 2. In this regard, nodes 246 and 250 may be considered to be input and/or output nodes of inverter section 218. One end of capacitance element 240 is coupled to node 246, and the other end of capacitance element 240 is coupled to node 248. One end of capacitance element 242 is coupled to node 244, and the other end of capacitance element 242 is coupled to node 250. In other words, capacitance element 240 is coupled between the first end of inductance element 236 and the second end of inductance element 238, while capacitance element 242 is coupled between the first end of inductance element 238 and the second end of inductance element 236. The inductance and capacitance of the components in crossed LC X-link 234 are selected based upon factors such as the switching frequency of inverter section 218, the output frequency, the amount of tolerable ripple current, etc. Crossed LC X-link 234 operates in a known manner to facilitate operation of impedance source inverter subsystem 208 in a buck or boost mode, as described in more detail below.

Impedance source inverter subsystem 208 generally operates in the following manner. Crossed LC X-link 234 is ideally modulated at twice (or six times, depending on the control method) the switching frequency of inverter section 218, because crossed LC X-link 234 is active during the off states of the switching network. During the off states of the switching network (i.e., all upper or lower switches on) the effective voltage of the impedance network can be boosted by turning on both switches in one, two, or three of the phase legs for a controlled duration. This shoot-through condition charges the inductors, which add to the available effective DC link voltage during the next active state of inverter section 218. In this regard, impedance source inverter subsystem 208 and crossed LC X-link 234 may function in accordance with known principles and techniques. For example, operation of a known impedance source power converter is described in U.S. Pat. No. 7,130,205, the content of which is incorporated by reference herein.

For the illustrated embodiment, node 248 is coupled to the low potential terminal of low voltage battery 204 (e.g., a ground or other reference), and node 244 is coupled to one side of switched diode element 214. Moreover, the other side of switched diode element 214 is coupled to the high potential terminal of low voltage battery 204. Switched diode element 214 may include a switch 252 and a diode 254 coupled antiparallel to switch 252. For this particular implementation, switch 252 and diode 254 are both coupled between the positive terminal of low voltage battery 204 and node 244. More specifically, the anode of diode 254 is coupled to low voltage battery 204, and the cathode of diode 254 is coupled to node 244. Controller 212 may be suitably configured to control the activation of switch 252 as needed to support operation of double ended inverter system 200 in different modes. For example, switched diode element 214 can be controlled into a first state (when switch 252 is closed) to accommodate charging of low voltage battery 204 via impedance source inverter subsystem 208. This first state corresponds to the recharge operating mode of double ended inverter system 200. Switched diode element 214 can also be controlled into a second state (when switch 252 is open) that limits current flow into low voltage battery 204. In other words, when in the second state, diode 254 allows current to flow from low voltage battery 204 into crossed LC X-link 234, while preventing or limiting current flow in the opposite direction.

Depending upon the implementation and manner of deployment of double ended inverter system 200, controller 212 can be suitably configured to control impedance source inverter subsystem 208 and/or inverter subsystem 210 in accordance with a number of different operating modes. Such operating modes may include, without limitation, a boost operating mode, a traditional inverter operating mode, a recharge operating mode, or the like. In the boost operating mode, impedance source inverter subsystem 208 boosts the nominal DC voltage of low voltage battery 204 for compatibility and matching with high voltage battery 206. To sustain the boost operating mode, controller 212 opens switch 252 such that crossed LC X-link 234 can function to increase the potential across nodes 246 and 250 to a voltage that exceeds that of low voltage battery 204. More specifically, the voltage across nodes 246 and 250 is boosted such that it approximates or equals the nominal DC voltage of high voltage battery 206. As a result, the AC output voltage of inverter section 218 is higher relative to the AC output voltage that would otherwise be obtained by a traditional inverter topology. This higher voltage afforded by the inclusion of impedance source inverter subsystem 208 can be used to operate double ended inverter system 200 at a more efficient operating point. For this type of operation, low voltage battery 204 is providing either active power to AC electric traction motor 202 or providing zero active power such that inverter section 218 is providing only reactive power to AC electric traction motor 202, acting to improve the power factor of double ended inverter system 200.

Controller 212 also opens switch 252 to sustain operation in the traditional inverter operating mode. In the traditional inverter operating mode, controller 212 maintains the nominal DC voltage of low voltage battery 204. In other words, the voltage is not boosted. Although the AC output voltage is limited, the desired motor operating point may not require a higher voltage and, hence, the lower available voltage may be sufficient, thus providing a more efficient overall operating point. As mentioned above, controller 212 closes switch 252 for the recharge operating mode, and controls inverter sections 218 and 220 to provide an appropriate flow of recharging energy into low voltage battery 204. During the recharge operating mode, impedance source inverter subsystem 208 is operated in a manner akin to a traditional inverter. In this mode, the AC output voltage of inverter section 218 is limited to that of a traditional inverter.

Referring also to FIG. 1, vehicle 100 is operated by providing power to wheels 106 via the AC electric traction motor 202, which receives its operating energy from low voltage battery 204 and/or high voltage battery 206. In order to power the motor, DC power is provided from low voltage battery 204 and high voltage battery 206 to inverter section 218 and inverter section 220, respectively, which convert the DC power into AC power, as is commonly understood in the art. In certain embodiments, if the motor does not require the maximum power output of low voltage battery 204, the extra power from low voltage battery 204 may be used to charge high voltage battery 206. Similarly, if the motor does not require the maximum power output of high voltage battery 206, the extra power from high voltage battery 206 may be used to charge low voltage battery 204. Of course, under certain operating conditions, controller 212 can be utilized to drive the motor using energy from both energy sources.

In operation, controller 212 receives a torque command for AC electric traction motor 202, and determines how best to manage the flow of power between low voltage battery 204 and impedance source inverter subsystem 208, and between high voltage battery 206 and inverter subsystem 210. In this manner, controller 212 also regulates the manner in which inverter section 218 and inverter section 220 drive AC electric motor 202. Double ended inverter system 200 may utilize any suitable control methodology, protocol, scheme, or technique. For example, certain aspects of the techniques and technologies described in U.S. Pat. Nos. 7,154,237 and 7,199,535 (both assigned to General Motors Corporation) may be employed by double ended inverter system 200. The relevant content of these patents is incorporated by reference herein.

In practice, the vehicle may include a battery controller, which may be separate from or integrated with controller 212 (typically, it will be separate). The battery controller is suitably configured to monitor the state of charge information (along with other information, such as cell balancing) of the batteries. The battery controller can analyze and/or process such information and provide a power capability to the vehicle controller. The vehicle controller processes the information obtained from the battery controller, along with driver commands, to determine how best to meet the driver's request and satisfy any subsystem requests such as power balancing between the two energy sources.

Although the illustrated embodiment utilizes an impedance source inverter subsystem for the low voltage side, alternate embodiments may utilize an impedance source inverter subsystem for the high voltage side in lieu of (or in addition to) an impedance source inverter subsystem for the low voltage side. In addition, the embodiment described above contemplates two DC energy sources having different nominal voltages. An alternate embodiment may utilize one or two impedance source inverter subsystems with two DC energy sources having approximately the same nominal voltage.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A double ended inverter system for an AC electric traction motor of a vehicle, the double ended inverter system comprising:
   a first energy source having a first nominal DC voltage;
   a second energy source having a second nominal DC voltage that is greater than the first nominal DC voltage;
   an inverter subsystem coupled between the second energy source and the AC electric traction motor, wherein the inverter subsystem is configured to drive the AC electric traction motor; and
   an impedance source inverter subsystem coupled between the first energy source and the AC electric traction motor, wherein the impedance source inverter subsystem is configured to drive the AC electric traction motor.

2. The double ended inverter system of claim 1, further comprising:
   a controller coupled to the impedance source inverter subsystem and to the inverter subsystem, the controller being configured to influence operation of the impedance source inverter subsystem and the inverter subsystem to manage power transfer among the first energy source, the second energy source, and the AC electric traction motor.

3. The double ended inverter system of claim 1, wherein the first nominal DC voltage is less than half of the second nominal DC voltage.

4. The double ended inverter system of claim 1, the impedance source inverter subsystem comprising:
   an inverter section; and
   a crossed LC X-link coupled between the inverter section and the first energy source.

5. The double ended inverter system of claim 4, the crossed LC X-link comprising:
   a first inductance element having respective first and second ends;
   a second inductance element having respective first and second ends;
   a first capacitance element; and
   a second capacitance element; wherein
   the first capacitance element is coupled between the second end of the first inductance element and the first end of the second inductance element; and
   the second capacitance element is coupled between the first end of the first inductance element and the second end of the second inductance element.

6. The double ended inverter system of claim 1, wherein:
   the first energy source is rechargeable; and
   the double ended inverter system further comprises a switched diode element coupled between the first energy source and the impedance source inverter subsystem, the switched diode element having a first state that accommodates charging of the first energy source via the impedance source inverter subsystem, and having a second state that limits current flow into the first energy source.

7. The double ended inverter system of claim 6, the switched diode element comprising:
   a switch coupled between a positive terminal of the first energy source and a reference node of the impedance source inverter subsystem; and
   a diode having an anode coupled to the positive terminal of the first energy source, and a cathode coupled to the reference node of the impedance source inverter subsystem.

8. The double ended inverter system of claim 1, wherein the first energy source and the second energy source are both rechargeable.

9. The double ended inverter system of claim 1, wherein the impedance source inverter subsystem is configured to boost the first nominal DC voltage.

10. A double ended inverter system for an AC electric traction motor of a vehicle, the vehicle having a first energy source having a first nominal DC voltage and a second energy source having a second nominal DC voltage, the double ended inverter system comprising:
    an impedance source inverter subsystem coupled between the first energy source and the AC electric traction motor, wherein the impedance source inverter subsystem is configured to drive the AC electric traction motor using the first energy source;
    an inverter subsystem, coupled between the second energy source and the AC electric traction motor, wherein the inverter subsystem is configured to drive the AC electric traction motor using the second energy source, wherein the second nominal DC voltage is greater than the first nominal DC voltage; and
    a controller coupled to the impedance source inverter subsystem and to the inverter subsystem, the controller being configured to control the impedance source inverter subsystem and the inverter subsystem in accordance with a boost operating mode, a traditional inverter operating mode, and a recharge operating mode of the double ended inverter system.

11. The double ended inverter system of claim 10, the controller being configured to influence operation of the impedance source inverter subsystem and the inverter subsystem to manage power transfer among the first energy source, the second energy source, and the AC electric traction motor.

12. The double ended inverter system of claim 10, wherein:
    the first nominal DC voltage is less than half of the second nominal DC voltage.

13. The double ended inverter system of claim 12, the controller being configured to sustain the boost operating mode by boosting the first nominal DC voltage for the impedance source inverter subsystem.

14. The double ended inverter system of claim 12, the controller being configured to sustain the traditional inverter operating mode by maintaining the first nominal DC voltage for the impedance source inverter subsystem.

15. The double ended inverter system of claim 10, the impedance source inverter subsystem comprising:
    a first inductance element having respective first and second ends;
    a second inductance element having respective first and second ends;
    a first capacitance element; and
    a second capacitance element; wherein
    the first capacitance element is coupled between the second end of the first inductance element and the first end of the second inductance element; and
    the second capacitance element is coupled between the first end of the first inductance element and the second end of the second inductance element.

16. The double ended inverter system of claim 10, wherein:
    the first energy source is rechargeable; and
    the double ended inverter system further comprises:
    a switched diode element coupled between the first energy source and the impedance source inverter subsystem, the switched diode element having a first state, corresponding to the recharge operating mode, that accommodates charging of the first energy source via the impedance source inverter subsystem, and having a second state that limits current flow into the first energy source.

17. An electric traction system for a vehicle having a low voltage battery having a first nominal DC voltage and a high voltage battery having a second nominal DC voltage greater than the first nominal DC voltage, the electric traction system comprising:
- an AC electric motor; and
- a double ended inverter system coupled to the AC electric motor, and configured to drive the AC electric motor using energy obtained from the high voltage battery and energy obtained from the low voltage battery, the double ended inverter system comprising:
- a first inverter section coupled to the AC electric motor;
- a crossed LC X-link coupled between the first inverter section and the low voltage battery; and
- a second inverter section coupled between the high voltage battery and the AC electric motor.

18. The electric traction system of claim 17, further comprising:
- a controller coupled to the first inverter section and to the second inverter section, the controller being configured to influence operation of the first inverter section and the second inverter section to manage power transfer among the high voltage battery, the low voltage battery, and the AC electric motor.

19. The electric traction system of claim 17, the crossed LC X-link comprising:
- a first inductance element having respective first and second ends;
- a second inductance element having respective first and second ends;
- a first capacitance element; and
- a second capacitance element; wherein
- the first capacitance element is coupled between the second end of the first inductance element and the first end of the second inductance element; and
- the second capacitance element is coupled between the first end of the first inductance element and the second end of the second inductance element.

20. The electric traction system of claim 19, wherein:
- the second end of the first inductance element is coupled to a first input node of the first inverter section;
- the second end of the second inductance element is coupled to a second input node of the first inverter section;
- the first end of the second inductance element is coupled to a low potential terminal of the low voltage battery; and
- the double ended inverter system further comprises a switched diode element coupled between the first end of the first inductance element and a high potential terminal of the low voltage battery.

* * * * *